United States Patent [19]
Corke et al.

[11] Patent Number: 4,948,222
[45] Date of Patent: Aug. 14, 1990

[54] OPTICAL FIBER UNIT ASSEMBLY PACKAGE

[75] Inventors: Michael Corke, Mendon; David E. Haynes, Milford; David W. Stowe, Medfield; Stillman Shaw, III, Bellingham; Joseph E. Vigeant, Milford, all of Mass.

[73] Assignee: Aster Corporation, Milford, Mass.

[21] Appl. No.: 280,033

[22] Filed: Dec. 5, 1988

[51] Int. Cl.$^5$ .............................................. G02B 6/36
[52] U.S. Cl. ............................. 350/96.20; 350/96.21; 350/96.22; 350/96.23
[58] Field of Search ............... 350/96.20, 96.21, 96.22, 350/96.23; 439/449, 460, 470, 473; 174/70 R, 70 S, 73.1, 84 C; 156/433, 60

[56] References Cited

U.S. PATENT DOCUMENTS

| | | | |
|---|---|---|---|
| 3,982,060 | 9/1976 | Avery et al. | 350/96.20 X |
| 4,082,422 | 4/1978 | Kloots | 350/96.23 |
| 4,283,125 | 8/1981 | Borsuk | 350/96.20 |
| 4,319,802 | 3/1982 | Bowes | 350/96.20 |
| 4,447,120 | 1/1984 | Borsuk | 350/96.20 |
| 4,576,437 | 3/1986 | Ohta et al. | 350/96.20 |
| 4,696,537 | 9/1987 | Bauer et al. | 350/96.20 |
| 4,730,893 | 3/1988 | Burmeister | 350/96.22 |
| 4,793,684 | 12/1988 | Oppenländer | 350/96.23 |
| 4,795,229 | 1/1989 | Abendschein et al. | 350/96.20 |
| 4,834,486 | 5/1989 | Walker | 350/96.20 |

FOREIGN PATENT DOCUMENTS

| | | | |
|---|---|---|---|
| 2538918 | 7/1984 | France | 350/96.20 X |
| 2191871 | 12/1987 | United Kingdom | 350/96.23 X |

OTHER PUBLICATIONS

Millet, "Connector Mount for Fiber Optic Bundle" IBM tech. discl. bull. vol. 14, No. 3, 8/71, p. 725.
Aster Singlemode Trees and Stars SM Series.
Amphenol Corp., Amphenol Interfuse Single Mode NxM Tree Star and Couplers, Jan. 2, 1987.
Codenoll Technology Corp., Codestar Optical Couplers.

Primary Examiner—Brian Healy
Attorney, Agent, or Firm—Fish & Richardson

[57] ABSTRACT

An optical fiber unit assembly package consists of a protective body having a lid and defining a volume, an entry for an optical fiber cable penetrating the body, at least one optical fiber cable extending through the entry and defining a conduit for an optical fiber cable. An anchor for an optical fiber cable is disposed within the entry as is a clamp for an optical fiber extending through the conduit within the package in a manner to isolate an internal optical fiber unit assembly within the volume from tensile forces applied externally upon the fiber. Secure mounting for optical fiber units within the volume are also provided.

7 Claims, 4 Drawing Sheets

4,948,222

OPTICAL FIBER UNIT ASSEMBLY PACKAGE

FIELD OF THE INVENTION

The invention relates to cable clamping, and more specifically to clamping and packaqing of optical fiber and optical fiber components in a mounted assembly for protection from external forces.

BACKGROUND OF THE INVENTION

Optical fiber units such as couplers are often assembled in a fashion which results in several such fiber optic units being joined together by relatively short lengths of optical fiber. Due to the delicate nature of optical fibers, it is desirable to provide protective packaging for such fibers and the resulting assemblage of fiber optic units. It is known, for example, to hold the protective jackets of fibers together by adhesives within a container.

It is an object of the present invention to provide a package made to contain the fiber optic units and the interconnecting fiber. The function of the package is to protect the fiber optic units and especially the optical fibers leading to the assemblage of units, the optical fibers interconnecting the units, and the fibers exiting from the assemblage of units. The protection of these components being necessitated by the delicate nature of the fibers, the susceptibility of such an assemblage to performance variations if the interconnecting fibers are allowed to bend freely during application of the assembly, and the generalized ease of handling advantage gained from the otherwise cumbersome collection of fiber optic units and interconnecting fibers. Additionally, protection from external environmental influences such as dirt, water, corrosive agents, and handling forces is required. Further it is desired to package the assemblage of units in a manner which facilitates the operations required to anchor the units and associated fibers within the package, in order to minimize manufacturing time and fiber breakage during packaging in the desired manner. It is also desirous to package the assemblage of fiber optic units in a manner which provides subsequent ease of mounting the package assembly in user equipment. A unit which incorporates all of these above features is also desired.

SUMMARY OF THE INVENTION

In preferred embodiments, the invention is a compact rectangular box of-size sufficient to house a number of fiber optic units, such as fiber optic couplers, and the requisite interconnecting fibers joining those fiber optic units. The box, referred to hereafter as the package, may be made from metal, plastic, or any material which offers the desired mechanical properties for a specific application. A typical package could be intended to house an assembly of fiber optic couplers. As an example, an assembly of fiber optic couplers may comprise an array of seven couplers interconnected to split the optical power coming into the assembly in one fiber into fractional light power leaving the assembly on eight fibers. Such an assembly of fiber optic units is often called a tree, a star, or most generally, an N by M coupler where N represents the number of input fibers, and M denotes the number of output fibers.

Optical fibers carrying optical power into and out of the assembly of fiber optic units pass through hollow tube cabling which is anchored firmly at the package by means of the invention. Commercially available hollow tube cabling containing a polymer strength member, for example a KEVLAR TM polyamide fiber sheath, to sustain high tensile loads can be used. The invention provides a novel anchoring mechanism wherein an appropriately sized ferrule is pressed or threaded into the package. The strength member of the cabling passes through this ferrule into the inside of the package where it is subsequently folded back around the ferrule and clamped in place using a circular spring clamp. When all the spring clamps are in place, the entire set of anchor ferrules are coated with an adhesive which more uniformly distributes the load among the KEVLAR fibers at each anchor and forms a seal against moisture penetration into the package.

Optical fibers may be subsequently fed through the anchored hollow tube cabling providing the required optical fiber access to and from the assembly of optical fiber units within the package. An important feature of the invention is the manner of anchoring the optical fibers within the package. While the purpose of a strengthened hollow-tube cable, as described above, is to isolate the optical fibers from tensile stresses that may occur during handling, mounting or use of the package, it is nevertheless possible for tensile stresses to occur within the optical fiber. For example, the free end of any fiber/hollow-tube cable unit may subsequently be utilized. During the operation of mounting a connector the optical fiber itself may be pulled sufficiently to cause damage at the package unless means are provided, e.g., within the package for isolation of such tensile forces from the assemblage of fiber optic units.

To achieve this optical fiber clamping according to the invention, a clamping surface is provided within the package. Optical fibers entering or leaving the package pass over this flat surface in a straight line with the anchoring ferrule. Typically the flat surface includes a layer of double sided adhesive tape or single-sided adhesive tape, and/or a layer of soft polymer such as cast RTV or rubber. A clamping plate, comprising a thin metal or plastic plate and a similar combination of tape and/or polymer is placed over the fibers and affixed to the flat surface within the package. The effect is to clamp the optical fibers firmly between layers of soft material in a manner which causes no breakage or loss of optical power to occur while simultaneously providing a firm attachment point beyond which tensile stresses outside the package are isolated from the inside assembly of units.

The fibers then pass further into the package where they enter optical fiber units, e.g. couplers, assembled therein. It is important to mount the assembly of optical fiber units and any splices or loops of excess fiber between units in the assembly in a manner to allow access for repair and that ensures protection from shock and vibration. It is also necessary to restrain the interconnecting fibers to avoid pinching or sharp bending at anytime during the assembly operation.

Another feature of the invention is novel means for mounting the fiber optic units within the package. Fiber optic couplers and splices are often cylindrically shaped. According to the invention, a tight fitting tube of polyurethane or other appropriate polymer is slid over the fiber optic unit. The tube is chosen to have a greater outside diameter than the internal vertical dimension of the package so that upon final closure of the package, which may be accomplished by a flat lid held in place by, e.g., screws, the placement of the lid compresses the tube applying mechanical force sufficient to firmly hold all the units in place within the package. In this manner all internal units are firmly but gently restrained against unwanted motion.

Another feature of the invention is means for sealing the lid joint comprising a groove formed in the body of the package through which the lid mounting screws pass. This groove may be filled with any commercial sealing material prior to application of the lid. When applied, the lid is sealed to the body by the sealing agent, and the mounting screws penetrate the lid and are subsequently sealed. Protection is also provided against loosening of the screws due to vibrations in the application environment.

These and other features and advantages of the invention will be apparent from the following description of the preferred embodiment and from the claims.

DESCRIPTION OF THE DRAWINGS

First we briefly describe the drawings.

DESCRIPTION OF THE PREFERRED EMBODIMENT

Figure 1:
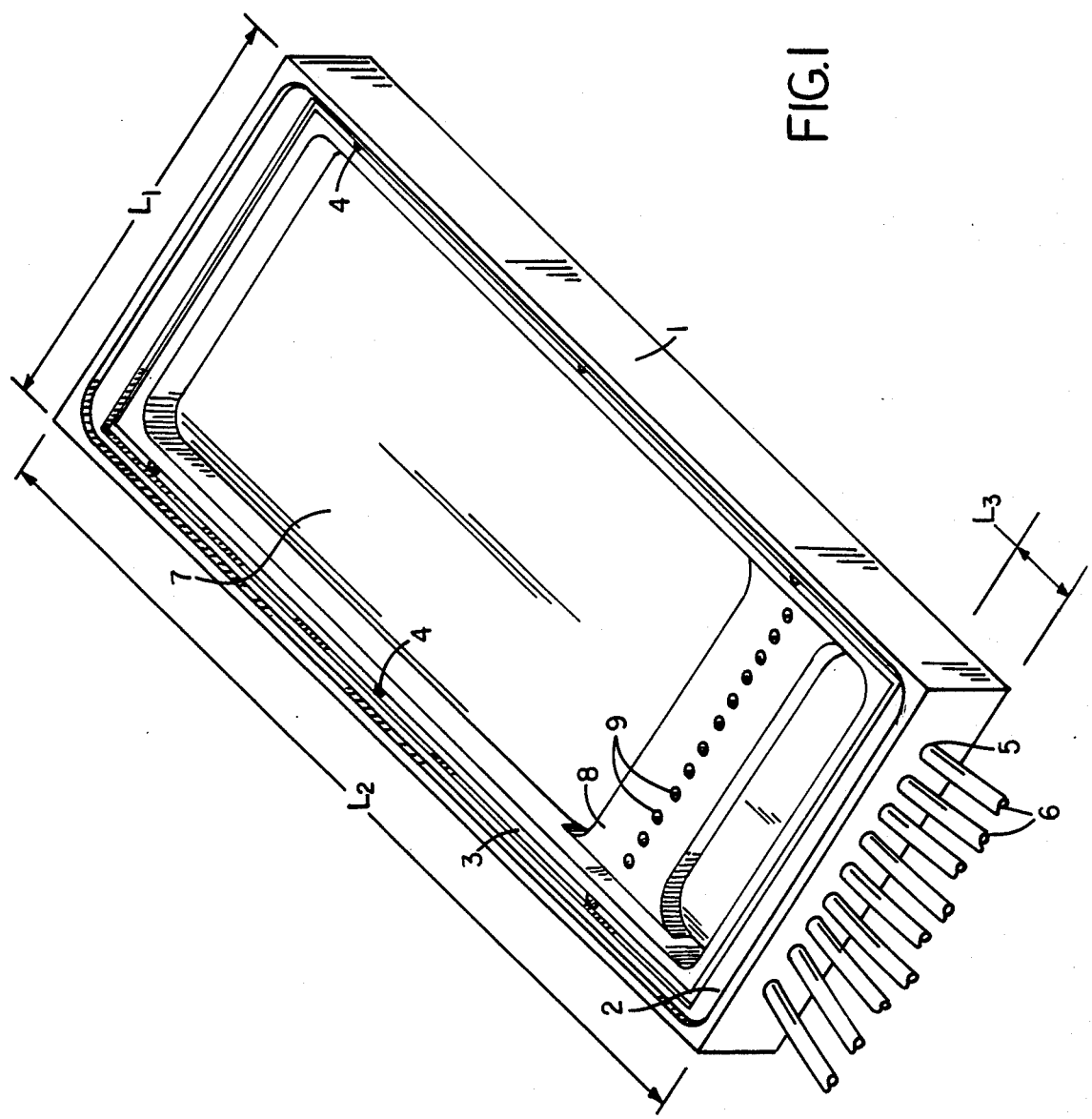
FIG. 1 is an isometric view of the bottom portion of the package.

Referring to FIG. 1, package body 1 of the invention is formed from metal or plastic, or other appropriate material. Relief 2 is provided so that the lid 23 (FIGS. 4-6) can be recessed into the material of the body 1. A groove 3 is formed around the entire perimeter, more or less centrally located within the relieved surface 2. Holes 4 are drilled and tapped at appropriate spacings along the center-line of the groove 3 for the purpose of attaching the lid to the body 1. Similarly, holes 5 are bored for mounting the cable anchoring ferrules (FIGS. 2 and 3) into which the open tube cables 6 are inserted. In the floor 7 of the package body 1, a raised platform 8 acts as the base of the fiber clamp discussed below. Holes 9, drilled and tapped in the platform on centers which do not interfere with the path of the optical fibers (as shown in FIG. 2), are used to affix a top plate of the fiber clamping means.

Typically the entire package measures $L_1$, about 3.50 inches, wide by $L_2$, about 7.75 inches, long by $L_3$, about 0.375 inches, high when used to package a one by eight fiber optic star assembly. These dimensions are clearly variable within the invention to optimize package size for more or less complex packaged assemblies of fiber optic units.

Figure 2:
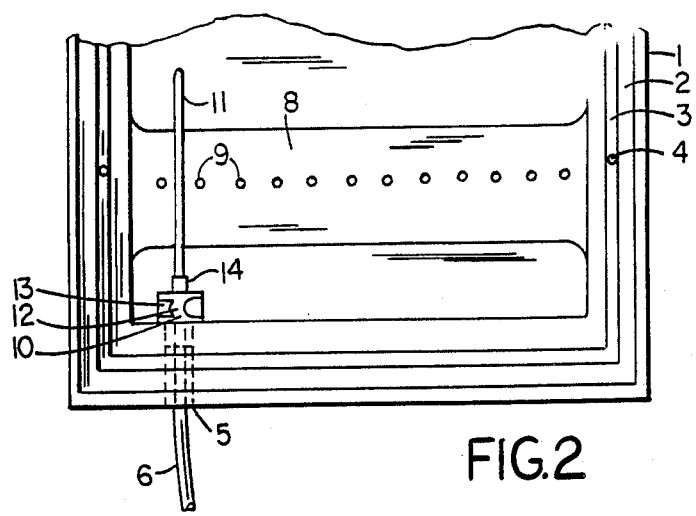
FIG. 2 is a partial top view of the bottom portion of the package showing a typical cable anchoring ferrule pressed into the package body.

Referring now to FIG. 2, one cable anchoring ferrule 10 mounted in the package body 1 is shown. The fiber clamping platform 8 is shown with an optical fiber 11 positioned properly. An open-tube cable 6 is inserted through the ferrule mounting hole 5 and anchoring ferrule 10. The strength member 12 is folded back around the internal end of the ferrule and clamped in place with a spring clamp 13, leaving the tube 14 extending a short distance into the inside of the package. In a one by eight fiber optic star package, there would be nine such ferrules 10, e.g. as suggested in FIG. 1.

Figure 3:
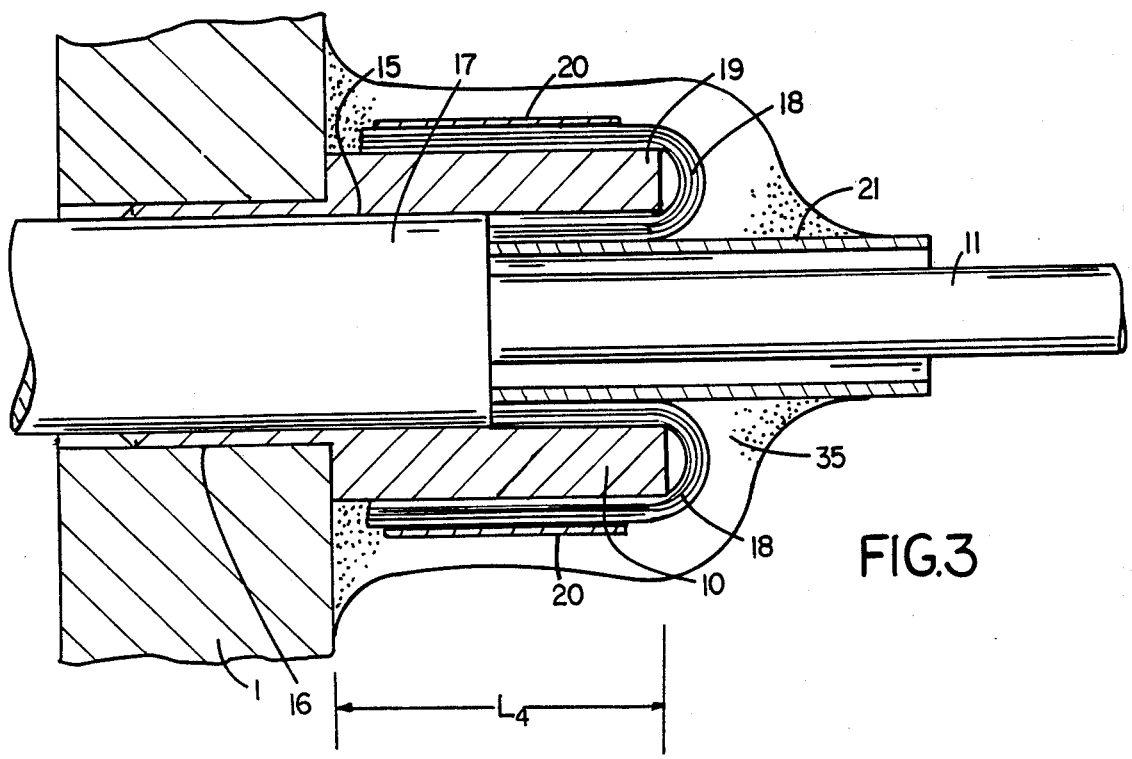
FIG. 3 is a sectional view of a cable anchoring ferrule mounted in the package body with all components shown.

FIG. 3 is a more detailed view of the cable anchoring ferrule, showing a cut away sectional view of the package body 1 and the details of the components of the cable anchor of the invention. As shown, anchoring ferrule 10 is preferably cylindrical, with a concentric, bored through hole 15 and has side walls of uniform wall thickness. The mounting surface 16 of the ferrule 10 preferably has a smaller diameter than the rest of the ferrule, as shown, or, alternatively, the ferrule 10 may have the same outside diameter along the entire length. The mounting surface 16 of the ferrule 10 is sized for press fit into the hole 5 of the package body 1 and the shoulder 19 of the ferrule extends a distance, $L_4$ into the interior of the package body.

The fiber optic cable 6 including concentrically, a jacket 17, strength member 18, open tube 21 and optic fiber 11, is inserted into the ferrule 10 including a mounting surface 16 and shoulder 19 so that the outer jacket 17 of the cable 10 is cut back exposing a length of cable longer than the extension $L_4$ of the ferrule shoulder L into the package body. Preferably the length of the strength member exposed is slightly greater than about 1.4 –1.6 times the length of the shoulder $L_4$, in the preferred embodiment, the strength member 18 exposed is about 0.375 inch. The strength member 18 is then wrapped back around the shoulder 19 of the ferrule and restrained with a circular spring clamp 20, as is known and commercially available. It will be understood that other clamping means might be provided, for example a cylindrical crimp ferrule could be slid over strength member and ferrule shoulder and then crimped to hold the fibers. Typically the clamp alone is not sufficient to firmly anchor the cable. Therefore, subsequent to mounting the spring clamp 20, an adhesive 35 is applied and allowed to thoroughly penetrate the individual fibers of the strength member 18. Properly applied, the adhesive, e.g. an epoxy, flows back into the ferrule 10 to wet the surfaces of the cable jacket 17, the strength member 18, the ferrule, and the open tube 21. Upon curing, the adhesive rigidly affixes the cable jacket 17 to the ferrule 10. It also distributes loads applied externally on the strength member 18 uniformly among the fibers of a strength member such as KEVLAR, to greatly increase the strength of anchoring. It also blocks the interface 15 of ferrule 10 and cable jacket 17 interface to prevent unwanted moisture penetration into the finished package. Experiments have shown that this anchor can easily withstand tensile loads of 4.4 pounds for thirty seconds. Open-tube cables used in such configurations are commercially available and have typical jacket outside diameters of about 0.120 inch.

Typically, laminar KEVLAR unimplemented strength members are used in these commercial cables. It is well known that KEVLAR, while quite strong (typical rated breaking strengths for such open-tube cables exceed ten pounds), the KEVLAR fibers, when bent or abraded in the anchoring means, become susceptible to nonuniform loading, and a single strand of a multistrand strength member can be placed under the full load of any tensile force applied. In these circumstances prior art fiber optic cable anchors may fail or break at loads significantly less than achieved in the package of the invention. A further advantage of the anchor of the invention is that the spring clamp 20 neatly gathers the strength member into a generally uniform concentric layer about the ferrule shoulder 19 to ease greatly the burden of assembly a compared to units using standard threaded retainers.

In FIG. 3, the optical fiber 11 is loose within the tube 21 of the cable 6, and the cable can be anchored to the package before any optical fibers are placed in the unit. This is a particularly attractive feature because it allows many fabrication handling operations to be performed without requiring precautions against optical fiber breakage. Also, since the fiber is not anchored by the cable anchor, tensile loads applied to the fiber external to the package are transferred directly into the package. Optical fiber units such as couplers and splice packages can be prone to failure if the associated optical fiber leads are subject to sudden jerks or tugs. In the package of the invention, this is avoided by clamping the optical fibers firmly to the package body, as will now be described.

Clamping of optical fibers requires application of compressive forces to the optical fiber. It is generally understood that compressive loads can lead to fiber microbending and loss of optical power. The present invention provides a clamp with the advantage that it not only firmly clamps the optical fiber, it does so without creating undue loss of optical power.

Figure 4:
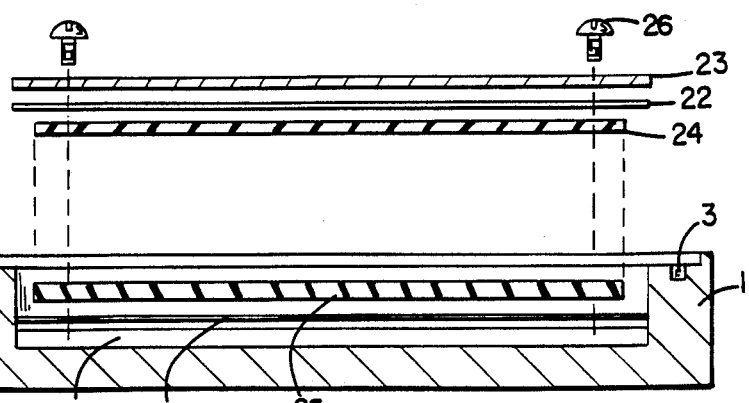
FIG. 4 is a sectional exploded view of the fiber clamping components.
Figure 5:
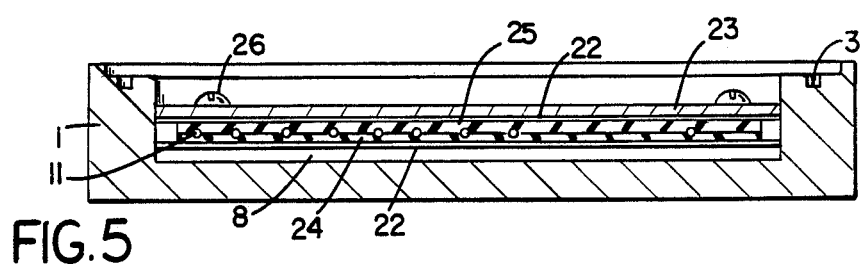
FIG. 5 is a sectional assembly view of the fiber clamping components.
Figure 4A:
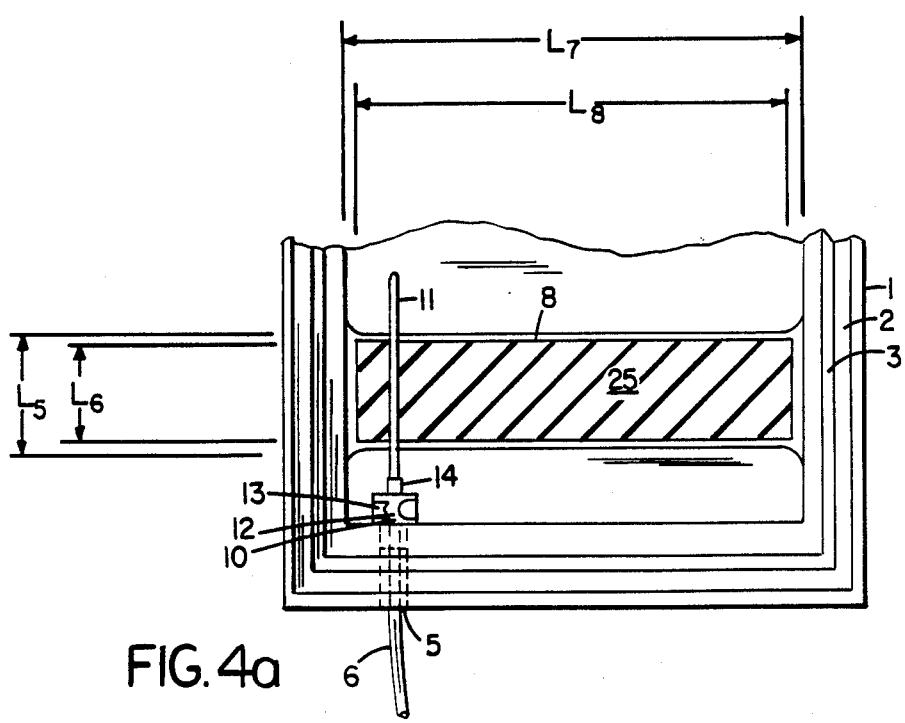
FIG. 4a. is a top view of the assembly of FIG. 4.

Referring now to FIG. 2, the fiber 11 passes through anchoring ferrule 10 and extends straight over the clamping platform 8. In the preferred embodiment, as shown in FIGS. 4 and 4a, layers of double-sided adhesive tape 22 (commercially available) are applied to the clamping plate 23 and the clamping platform 8. (The use of the adhesive tape 22 facilitates assembly but is not required mechanically.) The tape holds pieces of silicone rubber 24 and 25 (or any similar stable polymer or nature rubber) to the clamping plate and to the clamping platform, respectively, to create a soft clamping surface above and below the optical fibers 11, e.g. as shown in FIG. 5. Screws 26 (two shown) are then inserted through the clamping plate 23 into threaded holes 9 (FIG. 1) to be tightened to compress the rubber layers 24 and 25 about the optical fibers 11. The rubber layers are critically of the same dimension and smaller than the clamping surfaces in order to avoid application of forces unevenly, and are of thickness between about 0.010 and 0.0625 inch. As shown in FIG. 4a for example, the uncompressed dimensions $L_6$ and $L_8$ of the platform 8 are made slightly less than the uncompressed dimensions $L_5$ and $L_7$ of the rubber piece 25. The upper piece 24 would be made of similar dimensions. If the rubber above or below the optical fibers overhangs the edges of the clamping surfaces upon compression, or of the opposed rubber surface, the rubber may deform unpredictably during compression and bend the optical fibers toward the top or bottom of the package. Such bends can break the fibers or create partial losses of optical power. Typically clamping screws 26 are placed between optical fibers and at either end of the clamp outside the fibers so that if N fibers are present in the package, N+1 screws are required.

Tests have shown that the fiber clamp will affix the optical fibers adequately to withstand tensile loads of 2.2 pounds for thirty (30) seconds. Since no potting compounds or adhesives are used, the package is easily assembled and disassembled should replacement of an internal fiber optic unit be required.

The package of the invention houses an assembly of fiber optic units which are distributed inside the package in the recessed area 7 (FIG. 1). In most cases, the assembly of fiber optic units consists of a collection of fiber optic couplers and splices, each having its own package. These units are interconnected by optical fibers, and access to the assembly of fiber optic units is achieved by means of the fibers clamped in the fiber optic clamp. These units are mounted inside the package in a manner to prevent them from moving during handling or use of the package.

Figure 6:
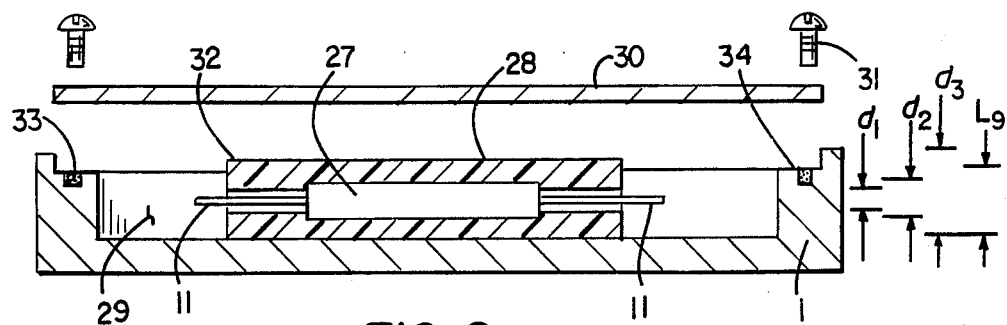
FIG. 6 is a cross sectional view of the fiber optic package before assembly.
Figure 6A:
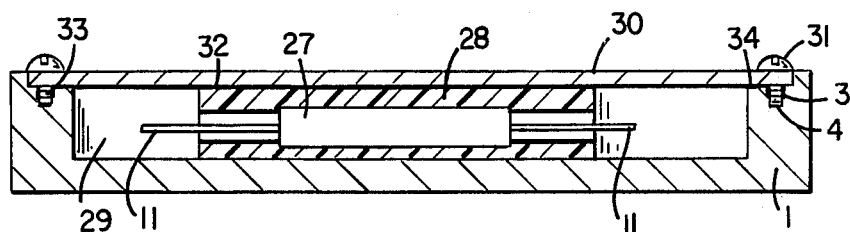
FIG. 6a is a sectional view of the fiber optic unit mounting design inside a package with the lid in place.

Referring to FIGS. 6 and 6a, fiber optic unit 27 is disposed within a polyurethane tube 28. The inside diameter $L_1$ of tube 28 is somewhat less than the outside diameter $d_2$ of the fiber optic unit 27 to provide an interference fit. The outside diameter $d_3$ of the polyurethane tube 28 is typically formed about 0.010 to 0.060 inches greater than the depth $L_4$ of the enclosed space 29 formed where the lid 30 of the package is seated as shown in FIG. 6. Therefore, when the lid 30 is applied and the screws 31 tightened, the lid 30 compresses the polyurethane tubes 32 and traps the fiber optic units tightly in the soft material of the tubing as shown in FIG. 6a. In this manner the fiber optic units are restrained against motion, and are also somewhat thermally isolated from the material of the package.

Before applying the lid 30, the groove 3 is filled with a sealing material 33. When the lid 30 is applied, the sealing material is forced into the joints 34 to form a gasket. Further, since the lid mounting screw holes 4 are tapped through the groove 3, both the threads and the heads of the screws are sealed by the sealing material to prevent undesired loosening of the screws and leakage around the head.

The completed package is waterproof, pressure resistant, shock and vibration tolerant, and protective of the optical fibers and the cables entering its enclosed space. The package is easily manufactured from any of a variety of materials, and allows simple assembly with minimal risk of optical fiber or optical fiber unit damage during assembly.

Figure 7:
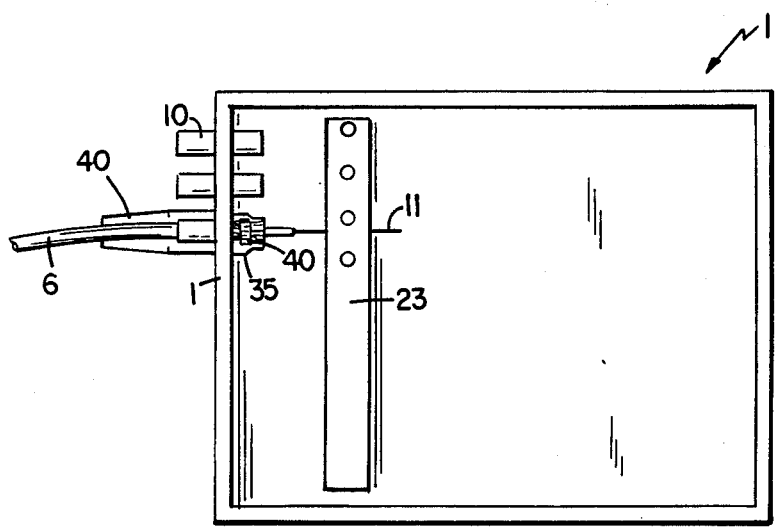
FIG. 7 is a top view of an embodiment of the package of the invention with external strain relief.

Other embodiments are within the following claims. For example, the ferrule may be threaded for engagement with the package body. In FIG. 7 there is shown a strain relief member 40 associated with the fiber external of the package. Preferably the ferrule 10 extends externally beyond the wall of the package 1 and relief 40 covers the extension and communicates and is held fast to the outer wall of package 1. The relief is formed of a material of sufficient stiffness such as a hard rubber or shrink tube to transfer stress. In other embodiments the components within the package might be further secured by potting compound.

What is claimed is:
1. An optical fiber unit assembly package comprising:
a protective body having a lid and defining a volume,
optical fiber cable entry means penetrating said body,
at least one optical fiber cable extending through said entry means and defining a conduit for an optical fiber,
means for anchoring said optical fiber cable within said entry means,
means for clamping an optical fiber extending through said conduit at a point within the package beyond said means for anchoring in a manner to isolate an internal optical fiber unit assembly associated with said optical fiber within said volume from tensile forces applied externally upon said fiber; and means for securely mounting optical fiber units within said volume.

2. The optical fiber unit assembly package of claim 1 wherein said entry means comprises a cylindrical ferrule disposed in a hole through said body.

3. The optical fiber unit assembly package of claim 2 wherein said means for anchoring comprises a circular spring clamp disposed about said ferrule in a manner to retain a cable strength member and an adhesive bond to strengthen and seal the anchoring penetration.

4. The optical fiber unit assembly package of claim 1 wherein said means for clamping the fibers comprises upper and lower clamp members defining surfaces upon which are mounted rubber slabs between which said optical fibers are compressed.

5. The optical fiber unit assembly package of claim 1 wherein said means for securely mounting the optical fiber units comprises a tight fitting polymer tube disposed about said fiber optic unit and subsequently compressed between said lid and body of said package.

6. The optical fiber unit assembly package of claim 1 further comprising means for sealing the package comprising a circumferential groove defined by said body into which there is disposed sealing material subsequently compressed by the lid in a manner to form a gasket between lid and body of said package.

7. The optical fiber unit assembly package of claim 1 further comprising means external of said package body for relief of strain upon said optical fiber.

* * * * *